(12) United States Patent
Cho et al.

(10) Patent No.: US 11,660,845 B2
(45) Date of Patent: May 30, 2023

(54) ELECTRONIC APPARATUS

(71) Applicant: Samsung Display Co., Ltd., Yongin-Si (KR)

(72) Inventors: Inwook Cho, Uiwang-si (KR); Dong-Su Yee, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 330 days.

(21) Appl. No.: 17/132,045

(22) Filed: Dec. 23, 2020

(65) Prior Publication Data
US 2021/0267079 A1 Aug. 26, 2021

(30) Foreign Application Priority Data
Feb. 26, 2020 (KR) .................. 10-2020-0023752

(51) Int. Cl.
| | | |
|---|---|---|
| *B32B 27/08* | (2006.01) | |
| *H04N 5/225* | (2006.01) | |
| *H05K 5/00* | (2006.01) | |
| *B32B 3/16* | (2006.01) | |
| *B32B 7/12* | (2006.01) | |

(52) U.S. Cl.
CPC .............. *B32B 27/08* (2013.01); *B32B 3/16* (2013.01); *B32B 7/12* (2013.01); *H04N 5/2257* (2013.01); *H05K 5/0017* (2013.01); *B32B 2307/412* (2013.01); *B32B 2307/42* (2013.01); *B32B 2457/20* (2013.01)

(58) Field of Classification Search
CPC .......... B32B 2307/412; B32B 2307/42; B32B 2457/20; B32B 27/08; B32B 3/16; B32B 7/12; G06F 1/1637; G06F 1/1652; G06F 1/1686; H04M 1/0264; H04M 1/0266; H04M 1/0268; H04M 1/185; H04N 5/2252; H04N 5/2257; H05K 5/0017
See application file for complete search history.

(56) References Cited

U.S. PATENT DOCUMENTS

| | | | |
|---|---|---|---|
| 9,335,793 | B2 | 5/2016 | Rothkopf |
| 10,571,734 | B2 | 2/2020 | Lee |
| 2016/0011633 | A1 | 1/2016 | Watanabe et al. |
| 2019/0215974 | A1 | 7/2019 | Shim et al. |

FOREIGN PATENT DOCUMENTS

| | | |
|---|---|---|
| JP | 6372649 | 8/2018 |
| KR | 10-1262252 | 5/2013 |
| KR | 10-2019-0085575 | 7/2019 |
| KR | 10-2019-0089578 | 7/2019 |

*Primary Examiner* — Lawrence D Ferguson
(74) *Attorney, Agent, or Firm* — F. Chau & Associates, LLC

(57) ABSTRACT

An electronic apparatus including: an electronic module; a display panel having a panel hole which overlaps the electronic module; and a window disposed on the display panel, wherein the window includes: a base substrate; a protective layer disposed on the base substrate and having an opening which overlaps the panel hole; and a cover glass disposed on the base substrate inside the opening.

23 Claims, 10 Drawing Sheets

ELECTRONIC APPARATUS

CROSS-REFERENCE TO RELATED APPLICATION

This U.S. non-provisional patent application claims priority under 35 U.S.C. § 119 to Korean Patent Application No. 10-2020-0023752, filed on Feb. 26, 2020, the disclosure of which is incorporated by reference herein in its entirety.

TECHNICAL FIELD

The present inventive concept relates to an electronic apparatus, and more particularly, to an electronic apparatus including a camera module.

DISCUSSION OF RELATED ART

Electronic apparatuses include smart phones, personal computers, laptop computers, personal digital terminals, car navigation systems, game machines, smart televisions, etc. Such electronic apparatuses include display modules and are used to provide information in image form. The electronic apparatuses may each include an electronic module for receiving external signals and providing output signals to the outside. For, example, the electronic module may include a camera module or the like.

To increase a region on which an image is displayed in an electronic apparatus, a camera module or the like may be arranged in a region on which an image is displayed. However, when the camera module is located in an image display region, scratches to the display surface overlapping the camera may reduce its image capture quality.

SUMMARY

An embodiment of the inventive concept provides an electronic apparatus including: an electronic module; a display panel having a panel hole which overlaps the electronic module; and a window disposed on the display panel, wherein the window includes: a base substrate; a protective layer disposed on the base substrate and having an opening which overlaps the panel hole; and a cover glass disposed on the base substrate inside the opening.

A thickness from the base substrate to an upper surface of the cover glass may be smaller than a thickness from the base substrate to an upper surface of the protective layer.

The window may further include a transparent resin layer disposed between the cover glass and the base substrate.

The window may further include a light-blocking resin layer disposed between the cover glass and the protective layer.

The light-blocking resin layer may surround an edge of the cover glass and fill a gap between the protective layer and the cover glass.

An adhesive force of the light-blocking resin layer with respect to the cover glass may be larger than an adhesive force of the transparent resin layer with respect to the cover glass.

A width of the opening is larger than a width of the panel hole.

The electronic apparatus may further include a print pattern disposed on a lower surface of the cover glass and overlapping an edge of the panel hole.

The print pattern may overlap an edge of the electronic module.

The print pattern may surround the electronic module.

The window may further include a shock absorbing layer disposed under the base substrate.

The electronic apparatus may further include a print pattern disposed on a lower surface of the shock absorbing layer and overlapping an edge of the panel hole.

The print pattern may overlap an edge of the electronic module.

The electronic apparatus may further include: a polarization plate disposed between the display panel and the shock absorbing layer and having a first hole which overlaps the panel hole; and a support member disposed under the display panel and having a second hole which overlaps the panel hole.

The display panel may be foldable.

The display panel may include a display region and a non-display region adjacent to the display region; and the panel hole may overlap the display region and be spaced apart from the non-display region.

An embodiment of the inventive concept provides an electronic apparatus including: a window; a display panel disposed under the window; a polarization plate disposed between the window and the display panel; a support member disposed under the display panel; and an electronic module disposed under the display panel, wherein the electronic module is disposed in a module hole passing through the polarization plate, the display panel and the support member, and the window includes: a substrate; a cover glass disposed on the substrate and overlapping the module hole; and a protective layer disposed on the substrate and not overlapping the module hole.

The protective layer may include an opening that overlaps the module hole; and the cover glass may be disposed in the opening.

An upper surface of the window may include an upper surface of the cover glass and an upper surface of the protective layer, and a height difference may exist between the upper surface of the cover glass and the upper surface of the protective layer.

The window may further include a print pattern disposed on a lower surface of the cover glass; and the print pattern may overlap an edge of the electronic module.

The window may further include: a transparent resin layer disposed between the substrate and the cover glass; and a light-blocking resin layer disposed between the cover glass and the protective layer.

An embodiment of the inventive concept provides an electronic apparatus including at least one folding region, the apparatus including: an electronic module; a display panel having a panel hole that overlaps the electronic module; and a window disposed on the display panel, wherein: the window includes: a substrate; a protective layer disposed on the substrate, wherein the protective layer includes a polymer film and an opening which overlaps the panel hole; a cover glass disposed on the substrate and disposed inside the opening; and a print pattern disposed between the substrate and the cover glass and overlapping an edge of the panel hole.

The window may further include: a transparent resin layer disposed between the substrate and the cover glass; and a light-blocking resin layer disposed between the cover glass and the protective layer.

BRIEF DESCRIPTION OF THE FIGURES

The above and other features of the inventive concept will become more apparent by describing in detail exemplary embodiments thereof with reference to the accompanying drawings. In the drawings.

DETAILED DESCRIPTION OF THE EMBODIMENTS

Figure 1:
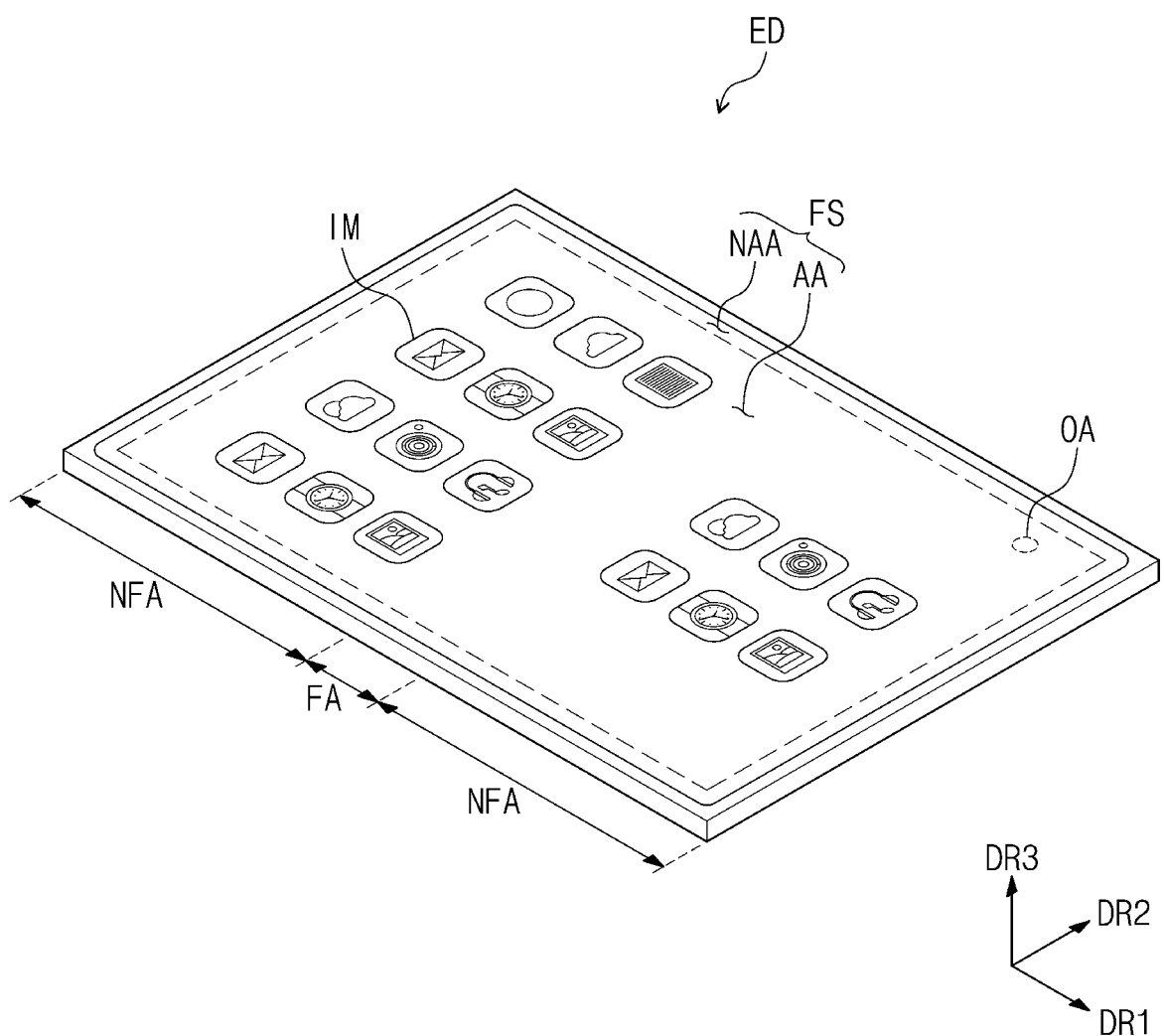
FIG. 1 is a perspective view illustrating an electronic apparatus according to an embodiment.

The present disclosure may be variously modified and have various forms, and specific embodiments will be illustrated in drawings and described in detail in the description. However, this does not limit the present disclosure within specific embodiments and it should be understood that the present disclosure covers all the modifications, equivalents, and replacements within the spirit and technical scope of the inventive concept.

In the following description, it will be understood that when an element (or a region, a layer, portion, etc.) is referred to as being "on", "connected to" or "coupled to" another element or layer, it can be directly on, connected or coupled to the other element or a third intervening element may be present therebetween.

The wording, "directly disposed" may mean a case in which there is no layer, film, region, plate or the like provided between the layer, film, region, or plate. For example, the wording "directly disposed" may mean a case in which two layers or two members are disposed without an additional member such as an adhesive member provided therebetween.

Like reference numerals may refer to like elements. In the figures, the thicknesses, the ratios and the dimensions of elements may be exaggerated for clarity purposes.

In addition, terms such as "below", "under", "on", and "above" may be used to describe the relationship between elements illustrated in the figures. The terms have relative concept, and are described with respect to directions illustrated in the figures. In the specification, the term "disposed on" may mean a case of being disposed not only on an upper portion but also on a lower portion of any one member.

Hereinafter, an electronic apparatus according to an embodiment of the inventive concept will be described with reference to drawings.

Figure 2:
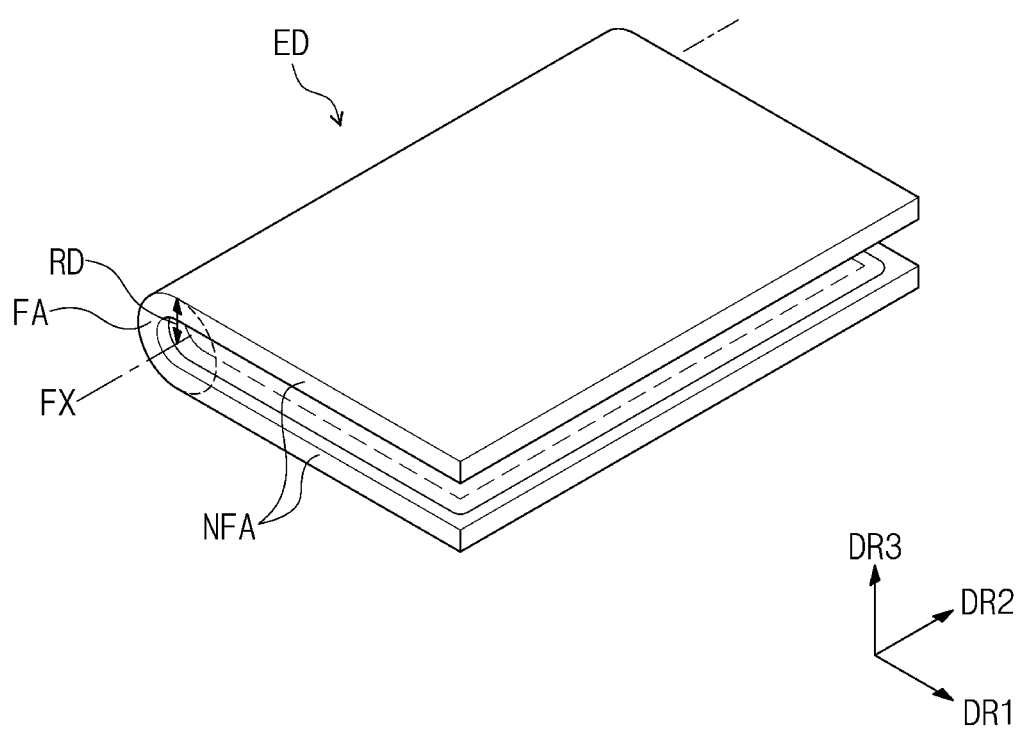
FIG. 2 is a perspective view of a folded state of an electronic apparatus according to an embodiment.
Figure 3:
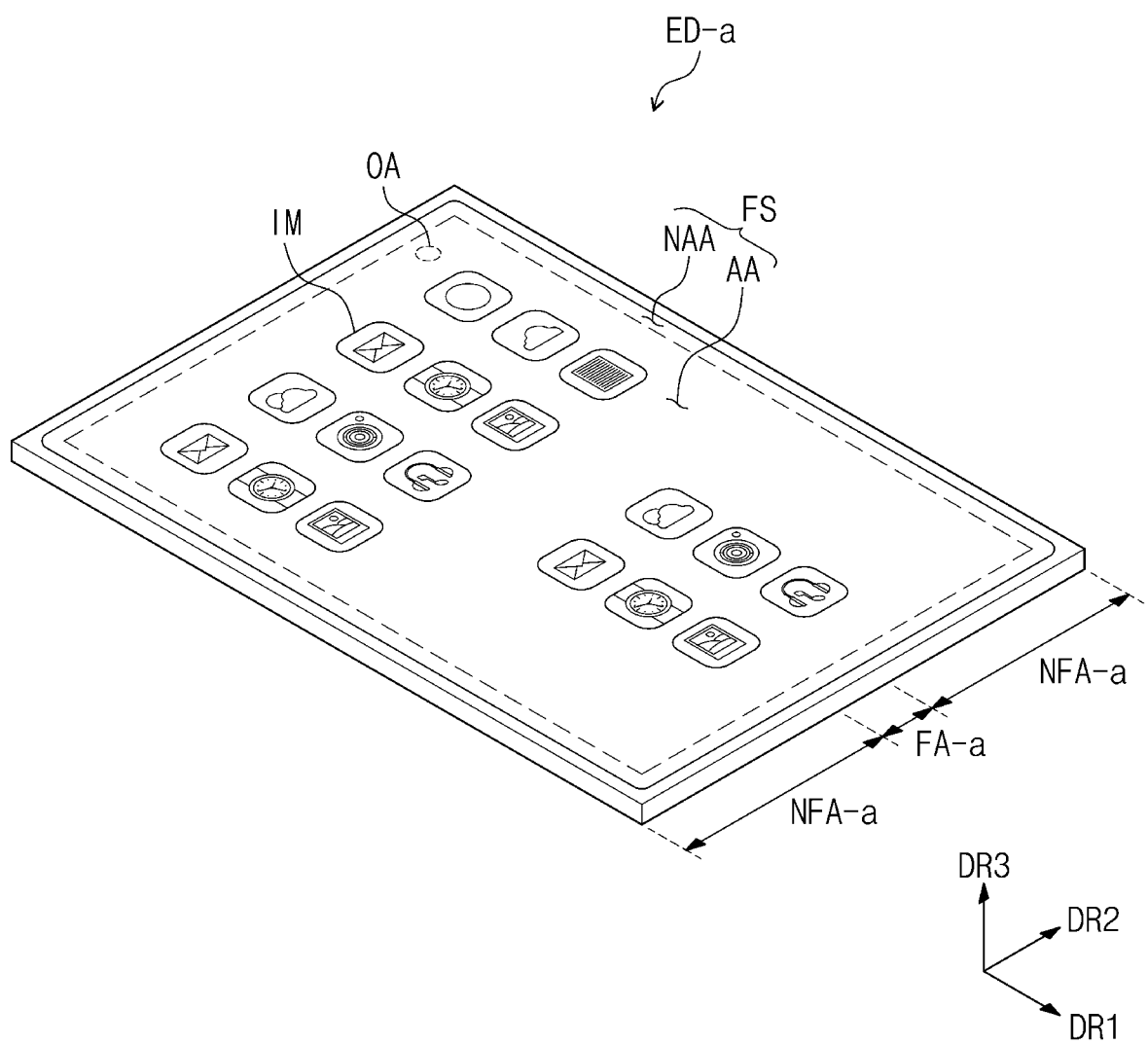
FIG. 3 is a perspective view illustrating an electronic apparatus according to an embodiment.
Figure 4:
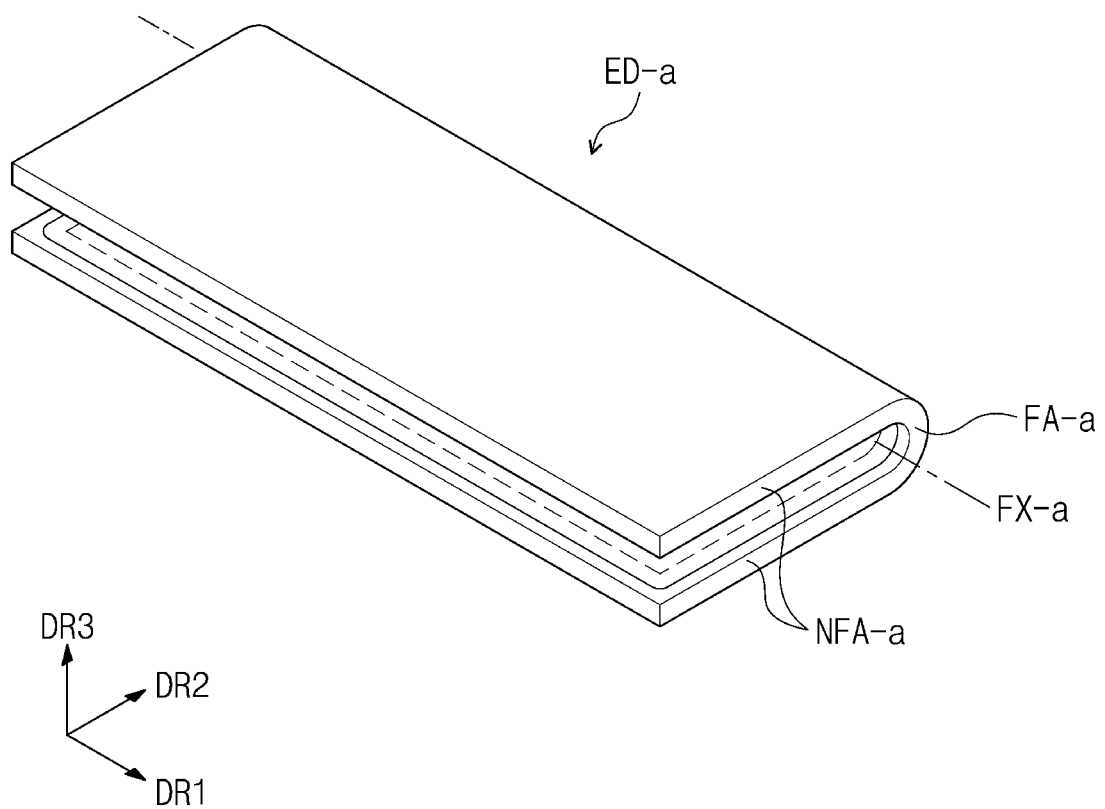
FIG. 4 is a perspective view of a folded state of an electronic apparatus according to an embodiment.

FIG. 1 is a perspective view illustrating an electronic apparatus according to an exemplary embodiment of the inventive concept. FIG. 2 is a view illustrating a state in which the electronic device illustrated in FIG. 1 is folded. FIG. 3 is a perspective view illustrating an electronic apparatus according to an embodiment of the inventive concept. FIG. 4 is a view illustrating a folded state of the electronic device illustrated in FIG. 3.

Electronic apparatuses ED and ED-a according to embodiments of the inventive concept may be smart phones, personal computers, laptop computers, personal digital terminals, car navigations, game machines, smart televisions, etc. FIGS. 1 to 4 illustrate smart phones as electronic devices ED and ED-a according to embodiments of the inventive concept.

The electronic apparatuses ED and ED-a according to embodiments of the inventive concept may each have long sides extending in the direction of a first direction axis DR1 and short sides extending in the direction of a second direction axis DR2 crossing the first direction axis DR1. For example, the electronic apparatuses ED and ED-a may have a rectangular shape. However, the inventive concept is not limited thereto, and the electronic devices ED and ED-a may have various shapes such as circles or polygons on a plane. For example, the electronic apparatuses ED and ED-a may have curved edges. The electronic apparatuses ED and ED-a may be flexible display devices.

In the electronic apparatuses ED and ED-a according to embodiments of the inventive concept, a display surface FS on which an image IM is displayed may be parallel to a surface formed by the first direction axis DR1 and the second direction axis DR2. The normal direction of the display surface FS, in other words, the thickness direction of the electronic devices ED and ED-a, is indicated by a third direction axis DR3. The display surface FS may correspond to the front surfaces of the electronic apparatuses ED and ED-a. The front surface (or upper surface) and the rear surface (or lower surface) of each of electronic apparatuses ED and ED-a are distinguished by the third direction axis DR3. Hereinafter, the first to third directions are directions respectively indicated by the first to third direction axes DR1, DR2 and DR3 and are referred to by the same reference symbols. However, the directions indicated by the first to third direction axes DR1, DR2 and DR3 may refer to other directions where indicated.

The electronic apparatuses ED and ED-a according to embodiments of the inventive concept may each include one or more folding regions FA and FA-a. The electronic apparatuses ED and ED-a according to embodiments of the inventive concept may include one or more non-folding regions NFA and NFA-a which are adjacent to the folding regions FA and FA-a. The electronic apparatuses ED and ED-a may include folding regions FA and FA-a and a plurality of non-folding regions NFA and NFA-a. The folding regions FA and FA-a may be disposed between the non-folding regions NFA and NFA-a. For example, the non-folding regions NFA may be disposed on opposite sides of the folding region FA.

In the electronic apparatus ED according to the embodiment illustrated in FIGS. 1 and 2, the folding region FA and the non-folding region NFA may be disposed adjacent to each other in the direction of the first direction axis DR1. In other words, the folding region FA and the non-folding region NFA are adjacent to each other along the first direction. The folding region FA may be an area that can be folded with respect to a folding axis FX extending in the direction of the second direction axis DR2. In an embodiment of the inventive concept, the folding axis FX may extend in a direction parallel to the short sides of the electronic apparatus ED. In an embodiment of the inventive concept, the radius RD of curvature of the folding region FA may be no greater than about 5 mm.

Excluding a folding operation, the electronic apparatus ED-a illustrated in FIG. 3 may have substantially the same configuration as the electronic apparatus ED illustrated in FIG. 1. According to the embodiment illustrated in FIGS. 3 and 4, the electronic apparatus ED-a may be folded in such a way that the folding region FA-a is bent with respect to the folding axis FX-a parallel to the first direction axis DR1. The folding axis FX-a may be a longitudinal axis parallel to the long sides of the electronic apparatus ED-a. In other words, the electronic apparatus ED illustrated in FIG. 1 may be folded with respect to the short sides of the electronic apparatus ED, whereas the electronic apparatus ED-a illustrated in FIG. 3 may be folded with respect to the long sides of the electronic apparatus ED-a.

FIGS. 1 and 4 each illustrate one folding region FA and FA-a and two non-folding regions NFA and NFA-a, but the numbers of the folding regions FA and FA-a and the non-folding regions NFA and NFA-a are not limited thereto. For example, the electronic apparatuses ED and ED-a may each include: a plurality of numbers of, in other words, more than two, non-folding regions NFA and NFA-a; and a plurality of numbers of folding regions FA and FA-a which are disposed between the non-folding regions NFA and NFA-a.

In the electronic apparatuses ED and ED-a according to embodiments of the inventive concept, the non-folding regions NFA and NFA-a may be disposed to be mutually symmetric with respect to the folding regions FA and FA-a. However, the inventive concept is not limited thereto, and the folding regions FA and FA-a disposed between the non-folding regions NFA and NFA-a, and the areas of two non-folding regions NFA and NFA-a facing each other with respect to the folding regions FA and FA-a may be different from each other.

Referring to FIGS. 1 to 4, the non-folding regions NFA and NFA-a face each other when the electronic apparatuses ED and ED-a are folded, and the electronic apparatuses ED and ED-a may be folded inwards so as not to expose the display surface FS to the outside. For example, the non-folding regions NFA and NFA-a overlap each other when the electronic apparatuses ED and ED-a are in a folded state. However, the inventive concept is not limited thereto, for example, the electronic apparatuses ED and ED-a may be folded outwardly so as to expose the display surface FS to the outside. In addition, the electronic apparatuses ED and ED-a according to an embodiment of the inventive concept may further include a rear display surface. The rear display surface may be an outer display surface which is in-folded to be exposed to the outside when the display surface FS on the front surface is not exposed to the outside. The rear display surface may provide a display surface through a rear surface window disposed on the housing HU (FIG. 5) side. When including the rear display surface, the electronic apparatuses ED and ED-a may each further include an additional display module other than the display module DM (FIG. 5) for displaying an image IM on the display surface FS on the front surface.

FIGS. 1 to 4 illustrate foldable electronic apparatuses, but the inventive concept is not limited thereto. The electronic apparatus according to an embodiment of the inventive concept may be a rollable display apparatus, a bendable display apparatus including a bending part, a flat rigid display apparatus, a bent rigid display apparatus, or the like.

The display surfaces FS of the electronic apparatuses ED and ED-a may each include an active region AA and a peripheral region NAA. The active region AA may be a region which is activated in response to an electrical signal. The active region AA is a region in which an image is displayed and external inputs having various forms may be detected. The external inputs may include inputs with various forms provided from the outside. For example, the external inputs may include external inputs (for example, a hovering object) which are applied to the active region AA not only by a contact with a body portion such as a hand of a user, but also by a detected approach or a sensed object within a predetermined distance to the electronic apparatuses ED and ED-a. In addition, the external input may have various forms, such as force, pressure, light, to the like, and the inventive concept is not limited to any one of these inputs.

The peripheral region NAA is adjacent to the active region AA. The peripheral region NAA may surround the active region AA. Accordingly, the active region AA may demarcated by the peripheral region NAA. However, this is merely exemplarily, and the peripheral region NAA may also be disposed adjacent to only one side of the active region AA or be omitted.

An opening region OA may be provided in each of the electronic apparatuses ED and ED-a. The opening region OA may be disposed in the active region AA. The opening region OA may be a region overlapping an electronic module EM. The image IM is not displayed in the opening region OA, and may be displayed while surrounding at least a portion of the periphery of the opening region OA. In the electronic apparatuses ED and ED-a according to the embodiments illustrated in FIGS. 1 to 4, the opening region OA is illustrated to be disposed adjacent to one-side edge of the display surface FS, but the inventive concept is not limited thereto. The opening region OA may correspond to the position and the size of the electronic module EM (FIG. 5), and a plurality of opening regions OA may be provided depending on the number of the electronic modules EM (FIG. 5).

In the electronic apparatuses ED and ED-a according to the embodiments of the inventive concept, the opening region OA may be a region in which a camera module or the like for capturing an external subject is disposed, or a region in which a photosensor for light detection is arranged. In the electronic apparatus ED according to an embodiment of the inventive concept, the electronic module may be a camera module EM. For example, in the electronic apparatus ED in an embodiment of the inventive concept, the electronic module EM may be a camera module EM disposed so that a lens faces an upper surface FS side.

Figure 5:
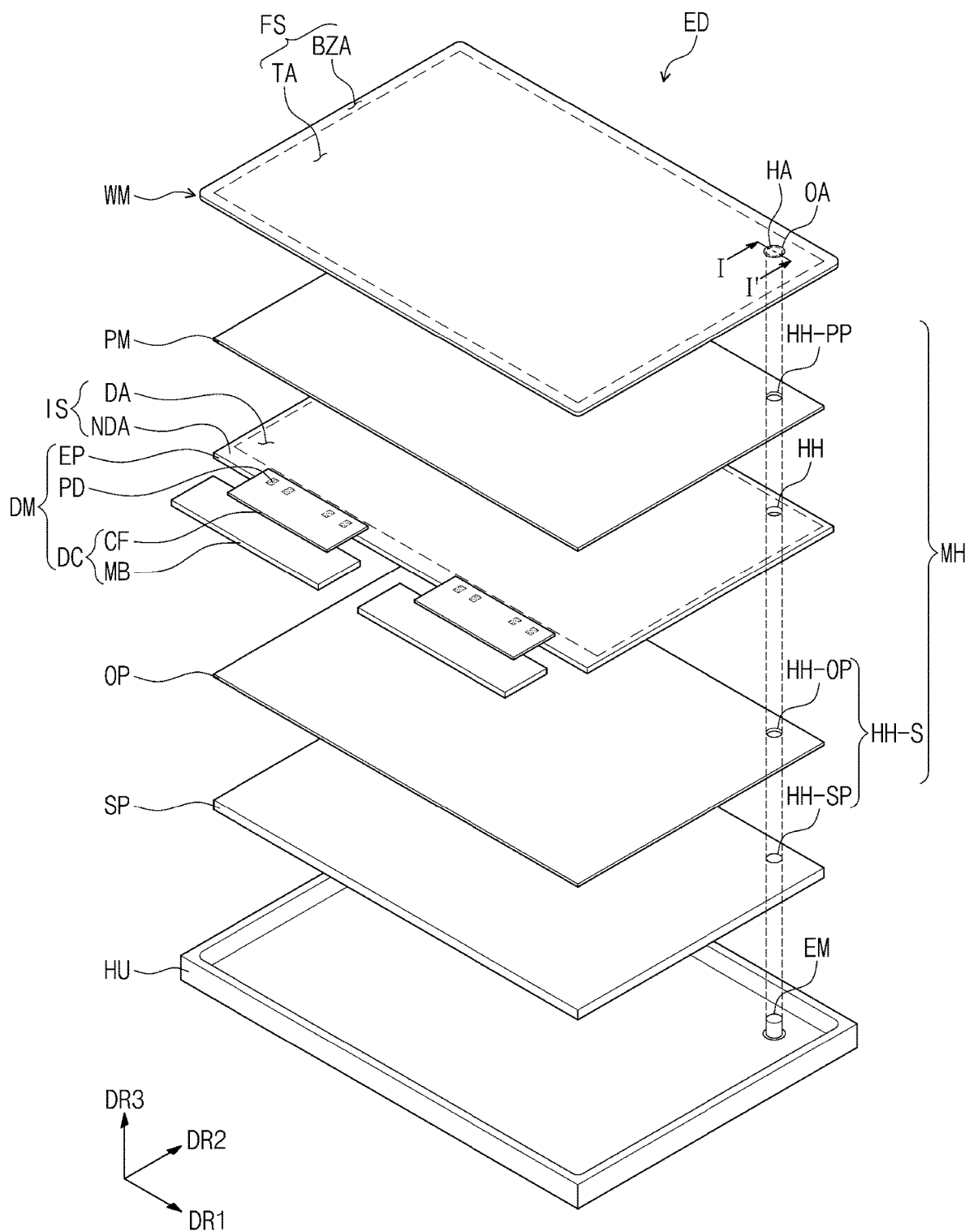
FIG. 5 is an exploded perspective view of an electronic apparatus according to an embodiment.
Figure 6:
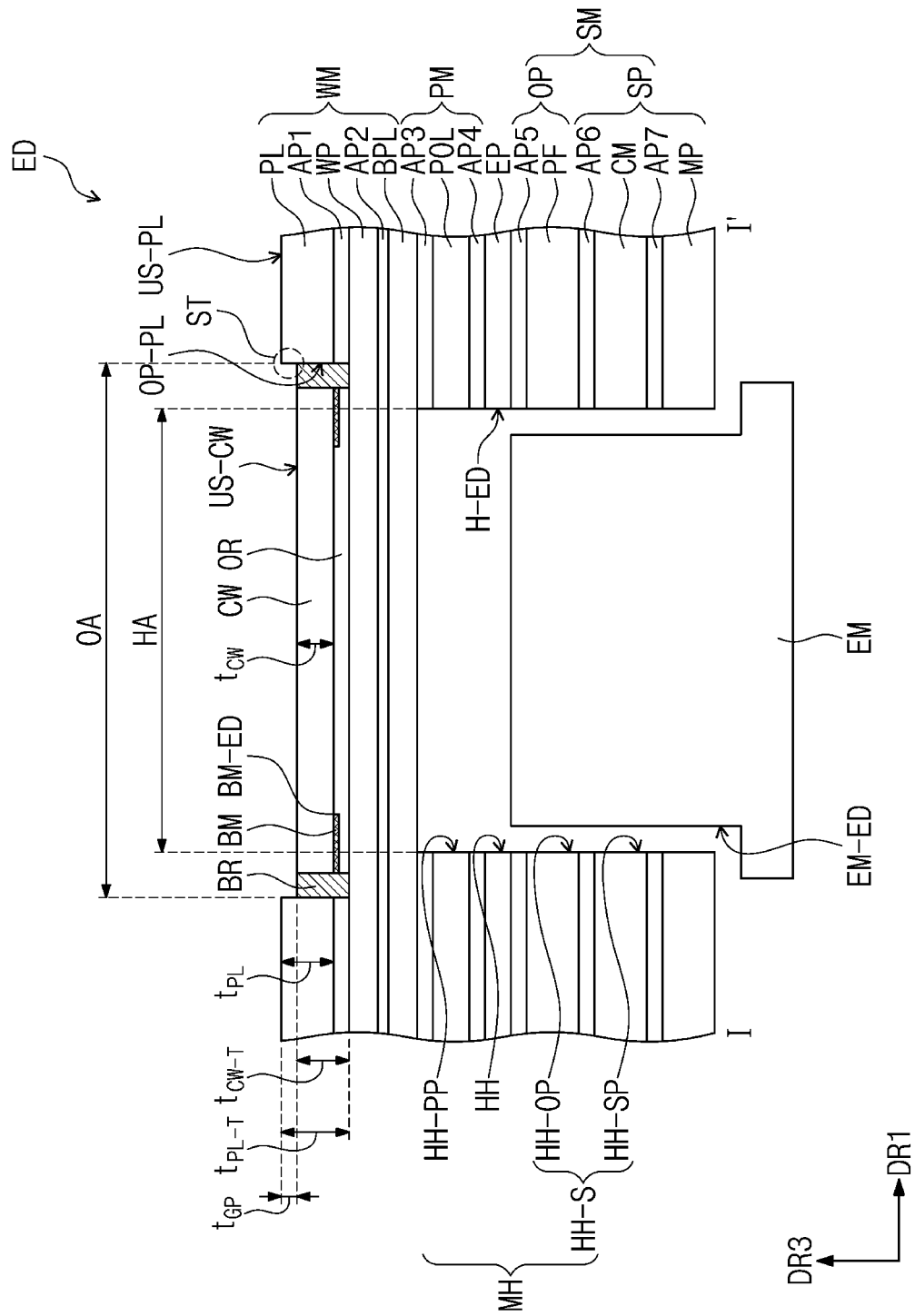
FIG. 6 is a cross-sectional view of an electronic apparatus according to an embodiment.
Figure 7:
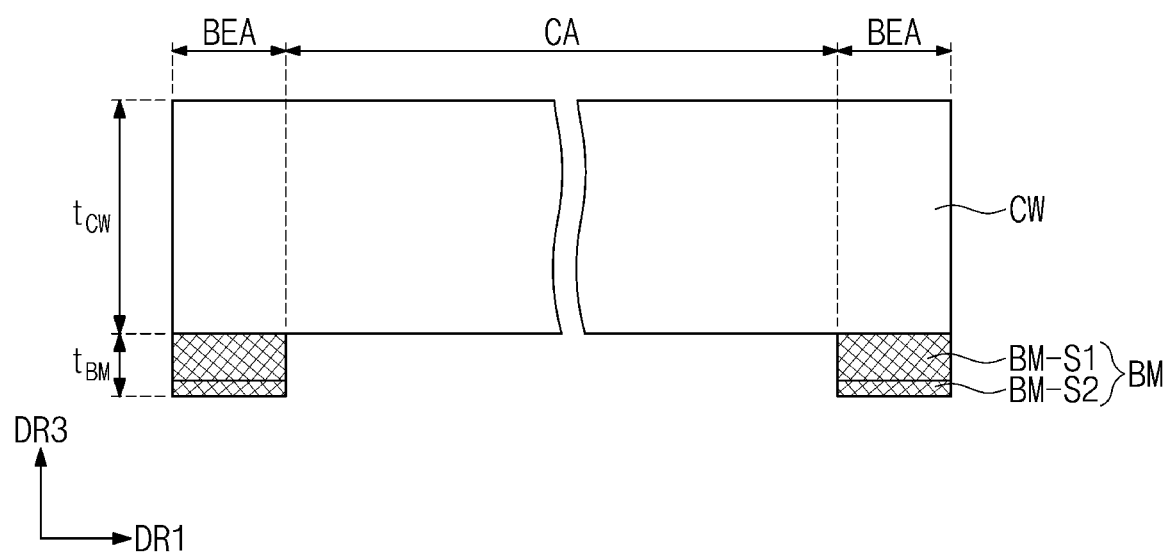
FIG. 7 is a cross-sectional view illustrating a portion of a window according to an embodiment.
Figure 8:
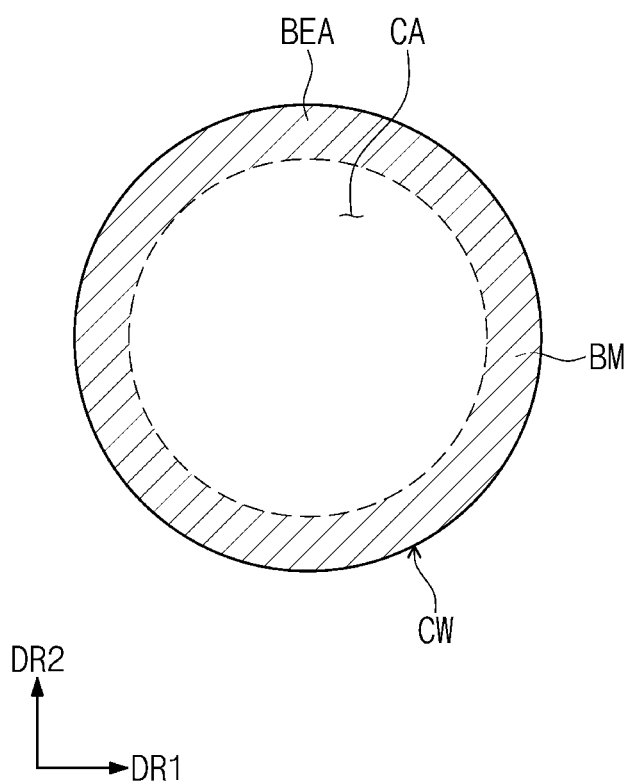
FIG. 8 is a plan view illustrating a portion of a window according to an embodiment.

FIG. 5 is an exploded perspective view of an electronic apparatus according to the embodiment of the inventive concept illustrated in FIG. 1. FIG. 6 illustrates a portion corresponding to line I-I' of FIG. 5, and is a cross-sectional view of the electronic apparatus according to an embodiment of the inventive concept. FIG. 7 is a cross-sectional view illustrating a portion of a window according to an embodiment of the inventive concept. FIG. 8 is a plan view illustrating a portion of a window according to an embodiment of the inventive concept.

The electronic apparatus ED according to an embodiment of the inventive concept may include an electronic module EM, a display panel EP, and a window WM. A panel hole HH is provided in the display panel EP and the electronic module EM may overlap the panel hole HH. The window WM may be disposed on the display panel EP.

The electronic apparatus ED according to an embodiment of the inventive concept may further include a housing HU for accommodating the electronic module EM and the display module DM. In addition, the electronic apparatus ED according to an embodiment of the inventive concept may further include a polarization plate POL and a shock absorbing layer BPL which are disposed on the display panel EP, and a support member SM disposed under the display panel EP.

In the electronic apparatus ED which is foldable along at least one folding axis extending in one direction according to an embodiment of the inventive concept, the total thickness of members disposed under the display panel EP may be adjusted to correspond to the total thickness of members disposed on the display panel EP to minimize damage when folding and unfolding operations are repeated. In other words, the members disposed under the display panel EP may be added so that a neutral surface is located on the display panel EP.

In the electronic apparatus ED according to an embodiment of the inventive concept, the window WM is disposed on the display module DM and covers the front surface IS of the display panel EP. The window WM may include a base substrate WP, a protective layer PL which is disposed on the base substrate WP and in which an opening OP-PL is provided, and a cover glass CW disposed inside the opening OP-PL. The opening OP-PL may overlap the electronic module EM.

The window WM includes an upper surface FS exposed to the outside. The upper surface FS (FIG. 1) of the electronic apparatus ED may be defined by the upper surface FS of the window WM. A transmissive region TA may be an optically transparent region in the upper surface FS of the window WM. The transmissive region TA may have a shape corresponding to a display region DA of the display panel EP. For example, the transmissive region TA overlaps the entirety of or a portion of the display region DA. The image IM (FIG. 1) displayed on the display region DA of the display panel EP may be viewed from the outside through the transmissive region TA.

On the upper surface FS of the window WM, a bezel region BZA may be a region having a lower light transmittance than the transmissive region TA. The bezel region BZA may demarcate the transmissive region TA. The bezel region BZA may be adjacent to the transmissive region TA and surround the transmissive region TA. In the alternative, the bezel region BZA may be disposed on just one side of the transmissive region TA or omitted.

The bezel region BZA may have a predetermined color. When the base substrate WP is provided as a glass or a polymer substrate, the bezel region BZA may be a color layer printed on one surface of the glass or polymer substrate or a deposited color layer. Alternatively, the bezel region BZA may be formed by coloring the corresponding region of the glass or polymer substrate.

The bezel region BZA may cover a non-display region NDA of the display panel EP and prevent the non-display region NDA from being viewed from the outside.

The base substrate WP may include an optically transparent insulating material. The base substrate WP may have ductility. For example, the base substrate WP may be a polymer film, a polymer substrate, or a thin-film glass substrate. The base substrate WP may have a single-layer or a multi-layer structure. The base substrate WP may correspond to a substrate having no phase difference or a low phase difference. For example, the base substrate WP may be a reinforced glass substrate, but the inventive concept is not limited thereto. The base substrate WP may be a thin-film glass substrate having durability against folding or unfolding. For example, the thickness of the base substrate WP may be about 30-50 μm, but the inventive concept is not limited thereto.

The protective layer PL may be disposed on the base substrate WP and protect the base substrate WP from an external environment. In addition, a first adhesive layer AP1 may be disposed between the base substrate WP and the protective layer PL. The first adhesive layer AP1 may be an optically clear adhesive layer. The first adhesive layer AP1 is disposed under the protective layer PL and over the base substrate WP. The first adhesive layer AP1 may not be disposed in the opening OP-PL provided in the protective layer PL.

The protective layer PL may be a layer exposed to the outside in the electronic apparatus ED. The protective layer PL may include a polymer material. For example, the protective layer PL may include a polyethylene terephthalate (PET) film. However, the inventive concept is not limited thereto, and the protective layer PL may be formed by using a polymer material which has ductility, is optically clear, and has durability against a surface scratch.

The opening OP-PL may be provided in the protective layer PL. The opening OP-PL may pass through the upper and lower surfaces of the protective layer PL. The opening OP-PL may overlap a panel hole HH provided in a display panel EP to be described later. The width of an opening region OA in which the opening OP-PL is provided may be larger than the width of a hole region HA in which the panel hole HH is provided. In other words, the width of the opening OP-PL in one direction on a plane may be larger than the width of the panel hole HH in the one direction.

The opening OP-PL in the protective layer PL may have a circular shape on a plane. However, the inventive concept is not limited thereto, and the opening OP-PL in the protective layer PL may have an elliptical or polygonal shape on a plane formed by the first direction axis DR1 and the second direction axis DR2.

A cover glass CW may overlap a hole region HA. The cover glass CW may overlap the entirety of the hole region HA. For example, the cover glass CW may extend beyond the sides of the hole region HA. The cover glass CW may be inserted into the opening OP-PL in the protective layer PL. In this case, the cover glass CW may overlap the base substrate WP in the opening OP-PL.

The cover glass CW is disposed inside the opening OP-PL, and the upper surface US-CW of the cover glass CW may form the front surface FS of the electronic apparatus ED together with the upper surface US-PL of the protective layer PL. The upper surface US-PL of the protective layer PL may protrude farther from the base substrate WP than the upper surface US-CW of the cover glass CW. The upper surface US-CW of the cover glass CW and the upper surface US-PL of the protective layer PL may serve as the upper surface of the electronic apparatus ED exposed to the outside. In other words, the upper surface US-CW of the cover glass CW and the upper surface US-PL of the protective layer PL may be the upper surface of the window WM.

The cover glass CW may be composed of an optically transparent glass material. The cover glass CW may be a reinforced glass. The cover glass CW may provide a transmissive region CA (FIG. 7) using the light transmittance of glass and include a reinforced surface to stably protect the electronic module EM from an external shock. The cover glass CW may be a reinforced glass substrate which is reinforced and processed by a chemical method such as ion exchange or a physical method such as slimming.

The hardness of the cover glass CW may be larger than the hardness of the protective layer PL. The cover glass CW has a high strength, so that the occurrence of scratch at its upper surface due to external exposure may be reduced compared to that of the upper surface US-PL of the protective layer PL. Accordingly, the cover glass CW is disposed in the area overlapping the electronic module EM, so that the sensitivity of the electronic module EM against an external input or the sensitivity of the signal output from the electronic module EM may be increased. For example, in an electronic apparatus ED according to an exemplary embodiment of the inventive concept in which is disposed a cover glass CW having high optical transparency and scratch resistance in an area overlapping an electronic module EM, the quality of the image captured by using the electronic module EM such as a camera module may be increased.

According to an embodiment of the inventive concept, the electronic apparatus ED includes the electronic module EM, the display panel EP having the panel hole HH which overlaps the electronic module EM and a window W M disposed on the display panel EP. The window WM may include the base substrate WP, a protective layer PL disposed on the base substrate WP and having an opening OP-PL which overlaps the panel hole HH and the cover glass CW disposed on the base substrate WP inside the opening OP-PL.

The thickness $t_{CW}$ of the cover glass CW may be smaller than the thickness $t_{PL}$ of the protective layer PL. The thickness $t_{CW}$ of the cover glass CW may be about 50 µm±5 µm. In addition, the thickness $t_{PL}$ of the protective layer PL may be about 70 µm±5 µm. However, the inventive concept is not limited thereto. The difference between the thickness $t_{CW}$ of the cover glass CW and the thickness $t_{PL}$ of the protective layer PL may be about 5-10 µm.

The minimum thickness $t_{CW-T}$ from the base substrate WP to the upper surface US-CW of the cover glass CW may be smaller than the minimum thickness $t_{PL-T}$ from the base substrate WP to the upper surface US-PL of the protective layer PL. The height difference $t_{GP}$ between the upper surface US-CW of the cover glass CW and the upper surface US-PL of the protective layer PL may be about 5-10 µm. In other words, a thickness from the base substrate WP to the upper surface US-CW of the cover glass CW is smaller than a thickness from the base substrate WP to the upper surface US-PL of the protective layer PL. In this case, the upper surface US-PL of the protective layer PL may be higher than the upper surface US-CW of the cover glass CW with respect to the base substrate WP. In other words, an uppermost surface of the cover glass CW is disposed below an uppermost surface of the protective layer PL. The cover glass CW may be a glass plate and the protective layer PL may be a polymer layer.

In the electronic apparatus ED according to an embodiment of the inventive concept, the upper surface US-CW of the cover glass CW may be recessed with respect to the upper surface US-PL of the protective layer PL. In other words, there may be a step difference ST in the portion of the protective layer PL adjacent to the cover glass CW. In the electronic apparatus ED according to an embodiment of the inventive concept, the upper surface US-PL of the protective layer PL protrudes further than the upper surface US-CW of the cover glass CW, and damage to the cover glass CW may be minimized even when external friction occurs. Accordingly, the quality of a front-surface captured image captured by passing through the cover glass CW may be increased.

The window WM may further include a transparent resin layer OR. The transparent resin layer OR may be disposed between the base substrate WP and the cover glass CW. The transparent resin layer OR may correspond to an adhesive member that couples the cover glass CW and the base substrate WP to each other. The transparent resin layer OR may be composed of an adhesive resin including at least one among an acryl resin, a silicone resin, a urethane resin, or an imide resin. The transparent resin layer OR may be an adhesive layer which is provided in a form of an adhesive film formed by curing and processing an adhesive resin or the like, or formed by providing an adhesive resin in a liquid phase between the base substrate WP and the cover glass CW and then performing a photo-curing or thermal curing process.

The transparent resin layer OR is disposed on the lower surface of the cover glass CW, attaches the cover glass CW onto the base substrate WP, and prevents moisture, contaminating materials, and the like from being transferred to the base substrate WP side. In addition, the transparent resin layer OR may perform a shock mitigating function and may thereby protect the cover glass CW and the base substrate WP.

The window WM may further include a light-blocking resin layer BR. The light-blocking resin layer BR may be disposed on the outer periphery of the cover glass CW. The light-blocking resin layer BR may be disposed between the cover glass CW and the protective layer PL. The light-blocking resin layer BR may surround the edge of the cover glass CW. In addition, in the embodiment illustrated in FIG. 6, the light-blocking resin layer BR may be disposed between the transparent resin layer OR and the first adhesive layer AP1. In addition, the light-blocking resin layer BR may contact the base substrate WP.

The light-blocking resin layer BR may be a joining member including a black pigment or dye. The light-blocking resin layer BR may be a joining layer which is provided in a form of an adhesive film which is composed of a light-blocking resin including a base resin such as an acryl resin, a silicone resin, a urethane resin, or an imide resin, a pigment, or a dye, or is formed by performing photo-curing or thermal curing of a light-blocking resin provided in a liquid phase on the outer periphery of the cover glass CW while filling the opening OP-PL.

The light-blocking resin layer BR may cover the edge of the opening OP-PL. In addition, the light-blocking resin layer BR may cover the side surfaces of the first adhesive layer AP1 exposed inside the opening OP-PL and prevent the first adhesive layer AP1 from flowing into the opening OP-PL. In addition, the light-blocking resin layer BR may exhibit a light-blocking effect. The light-blocking resin may have a black color. However, the inventive concept is not limited thereto, and the light-blocking resin layer BR includes a material for blocking light and the color thereof is not limited to the black.

The adhesive force of the light-blocking resin layer BR may be larger than the adhesive force of the transparent resin layer OR. In an embodiment of the inventive concept, the adhesive force of the light-blocking resin layer BR with respect to the cover glass CW may be larger than the adhesive force of the transparent resin OR with respect to the cover glass CW. In other words, the adhesive force of the transparent resin layer OR for totally coupling the cover glass CW and the base substrate WP may be low, and thus, when a defect is detected after the coupling of the cover glass CW and the base substrate WP, the cover glass CW is easily detached from the base substrate WP so that a repair process may be performed.

In addition, unlike that illustrated in FIG. 6, the transparent resin layer OR may correspond to the entirety of the cover glass CW. The transparent resin layer OR may be disposed to fill the gap between the opening parts in the first adhesive layer AP1 of the window WM. In other words, the transparent resin layer OR may extend from opposite sides on the opening OP-PL. In this case, the light-blocking resin layer BR may be disposed on the transparent resin layer OR. In other words, the light-blocking resin layer BR may be disposed on the transparent resin layer OR while filling the space between the cover glass CW and the protective layer PL.

The electronic apparatus ED according to an embodiment of the inventive concept may include the transparent resin layer OR for fixing the cover glass CW and the light-blocking resin layer BR and exhibit durability against an external shock by increasing the adhesive force between the cover glass CW and the base substrate WP.

The window WM may further include a print pattern BM. The print pattern BM may be disposed on the lower surface of the cover glass CW. The print pattern BM may be disposed between the cover glass CW and the transparent resin layer OR. The print pattern BM may extend from the light-blocking resin layer BR to a protruding portion of the transparent resin layer OR. The print pattern BM may be provided by printing a light-blocking material on the lower surface of the cover glass CW.

The portion provided with the print pattern BM corresponds to a light-blocking region BEA and may be disposed on the outer periphery of the transmissive region CA. The print pattern BM may have a closed line shape that surrounds an edge EM-ED of the electronic module EM on a plane. For example, the print pattern BM may have a ring shape. However, the inventive concept is not limited thereto, and the print pattern BM may depend on the shape of the electronic module EM and the shape of the opening OP-PL in the protective layer PL, or the like. The cover glass CW may include a transmissive region CA and a light-blocking region BEA, and the light-blocking region BEA may be a region in which the print pattern BM is disposed. In other words, the light-blocking region BEA may include the print pattern BM and the portion of the cover glass CW overlapping the print pattern BM.

The edge BM-ED of the print pattern BM may be positioned further inside the opening region OA than the edge EM-ED of the electronic module EM. The print pattern BM may overlap a hole edge H-ED that defines a panel hole HH and an edge EM-ED of the electronic module EM overlapping the panel hole HH. In other words, when viewed in a plane, the print pattern BM overlaps the hole edge H-ED and the electronic module edge EM-ED and may prevent the hole edge H-ED and the electronic module edge EM-ED from being viewed at the display surface FS. A gap may be formed between the hole edge H-ED and the electronic module edge EM-ED and may also be overlapped by the print pattern BM.

The print pattern BM may be a printed layer including a pigment and a dye. The print pattern BM may have a black color. However, the inventive concept is not limited thereto, and the print pattern BM may include a material for blocking light and the color thereof is not limited to just black.

The print pattern BM may include a plurality of number of sub print layers BM-S1 and BM-S2. Referring to FIG. 7, the print pattern BM according to an embodiment of the inventive concept may include two layers of laminated sub print layers BM-S1 and BM-S2. The thicknesses of the two layers of the sub print layers BM-S1 and BM-S2 may be different from each other. For example, the thickness of the first sub print layer BM-S1 adjacent to the cover glass CW may be larger than the thickness of the second sub print layer BM-S2 disposed under the first sub print layer BM-S1. The first sub print layer BM-S1 is first printed when forming the print pattern BM, and then the second sub print layer BM-S2 may be provided on the first sub print layer BM-S1.

The thickness $t_{Bm}$ of the print pattern BM may be no greater than about 10 μm. The sum of the thickness $t_{CW}$ of the cover glass CW and the thickness $t_{BM}$ of the print pattern BM may be smaller than the thickness $t_{PL}$ of the protective layer PL.

In the electronic apparatus ED according to an embodiment of the inventive concept, the print pattern BM is provided on the lower surface of the cover glass CW and may cover the edge portions of members viewable from a hole region HA. In addition, since the print pattern BM that covers the edge EM-ED portion of the electronic module EM is provided, the light incident to the electronic module EM in the external side surface direction of the electronic apparatus ED is blocked. Thus, the strength of the electronic module EM may be increased.

In the electronic apparatus ED according to an embodiment of the inventive concept, the window WM may further include a shock absorbing layer BPL. The shock absorbing layer BPL may be disposed under the base substrate WP and increase the durability of the window WM. The shock absorbing layer BPL may include a polymer material. The shock absorbing layer BPL may be provided in the form of a polymer film. For example, the shock absorbing layer BPL may be a polyethylene terephthalate film, a cyclo-olefin film, a polyether sulfone film, a polyimide film, or the like. However, the inventive concept is not limited thereto. The shock absorbing layer BPL may function as a support layer that supports the base substrate WP. The shock absorbing layer BPL may be stretched during a folding operation of the electronic apparatus ED, and may be, for example, a polymer film.

A hole may be provided under the base substrate WP and the shock absorbing layer BPL. The shock absorbing layer BPL may be optically transparent. In other words, the shock absorbing layer BPL may have a high transmittance to minimize the influence of shock on the operation of the electronic module EM, and have optical characteristics having no phase difference.

A second adhesive layer AP2 may be disposed between the shock absorbing layer BPL and the base substrate WP. The second adhesive layer AP2 may be an optically clear adhesive layer.

The display module DM may be disposed under the window WM. The display module DM may include a display panel EP and a circuit board DC.

In an embodiment of the inventive concept, the display panel EP may function as an output apparatus. For example, the display panel EP displays an image IM on an active region AA (FIG. 1), and a user may acquire information through the image. In addition, the display panel EP may function as an input apparatus for detecting an external input applied to the active region AA (FIG. 1).

The display panel EP includes a front surface IS and a rear surface facing the front surface 1S. The front surface IS may include: a display region DA for displaying an image detecting an external input; and a non-display region NDA adjacent to the display region. The non-display region NDA may be a region in which a driving circuit for driving pixels of the display region DA and wires connected to the driving circuit are disposed. In addition, wires connected to the detection electrodes for detecting external inputs may be disposed in the non-display region NDA. The display region DA overlaps at least a portion of the active region AA (FIG.

1), and the non-display region NDA may overlap at least a portion of the peripheral region NAA (FIG. 1).

According to an embodiment of the inventive concept, a panel hole HH which passes through the front surface IS of the display panel EP and the rear surface of the display panel EP may be provided in the display panel EP. The panel hole HH may overlap the electronic module EM. The portion in which the panel hole HH is formed may be a hole region HA.

The panel hole HH may be positioned inside the display region DA. The panel hole HH may be an area which is spaced apart from the non-display region NDA and located inside the display region DA. In other words, the panel hole HH may overlap the active region AA (FIG. 1) and be spaced apart from the peripheral region NAA (FIG. 1) when viewed in a plane.

A circuit board DC may be connected to the display panel EP. The circuit board DC may include a flexible board CF and a main board MB. The flexible board CF may include an insulating film and conductive wires mounted on the insulating film. The conductive wires are connected to pads PD and electrically connect the circuit board DC and the display panel EP.

In an embodiment of the inventive concept, the flexible board CF may be assembled in a bent state. Accordingly, the main board MB may be disposed on the lower surface of the display panel EP and be stably accommodated inside a space provided by the housing HU. In addition, in an embodiment of the inventive concept, the flexible board CF may be omitted, and in this case, the main board MB may directly be connected to the display panel EP.

The main board MB may include signal lines and electronic elements. The electronic elements may be connected to the signal lines and electrically connected to the display panel EP. The electronic elements generate various electrical signals, such as a signal for generating an image IM or a signal for detecting an external input, or process the detected signals. In addition, the main substrate MB may be provided in plural, and the inventive concept is not limited thereto.

The polarization member PM may be disposed on the display panel EP. The polarization member PM may include a polarization plate POL. In addition, the polarization member PM may further include adhesive layers AP3 and AP4 which are disposed on at least one among the upper surface and the lower surface of the polarization plate POL. The adhesive layers AP3 and AP4 may be optically transparent adhesive layers, but the inventive concept is not limited thereto. Referring to FIG. 6, a third adhesive layer AP3 may be disposed between the polarization plate POL and the window WM, and a fourth adhesive layer AP4 may be disposed between the display panel EP and the polarization member PM.

The polarization plate POL according to an embodiment of the inventive concept may include a linear polarization layer and at least one phase retarding layer. The linear polarization layer may be an optical layer for linearly polarizing the light provided in one direction. The phase retarding layer may be a $\lambda/2$ phase retarding layer and a $\lambda/4$ phase retarding layer. The polarization member PM may function to reduce a reflection phenomenon due to external light.

In the polarization plate POL, a first hole HH-PP overlapping the electronic module EM may be provided. The first hole HH-PP may pass though the polarization plate POL. An edge of the first hole HH-PP may be coincident with an edge of the panel hole HH. FIGS. 5 and 6 illustrates that the width of the first hole HH-PP and the width of the panel hole HH are the same. However, the inventive concept is not limited thereto, and referring to FIG. 6, the width of the first hole HH-PP and the width of the panel hole HH may be different from each other on a cross-section parallel to the surface formed by the first direction axis DR1 and the third direction axis DR3.

An electronic apparatus ED according to an embodiment of the inventive concept may include a support member SM disposed under a display panel EP. The support member SM may include a compensation part OP and a support part SP. A second hole HH-S may be provided in the support member SM. The second hole HH-S corresponds to a hole passing through the support member SM. The second hole HH-S may include a compensation part hole HH-OP in the compensation part OP and a support part hole HH-SP in the support part SP. An edge of the second hole HH-S may be coincident with an edge of the panel hole HI. The second hole HH-S may overlap a panel hole HH. The second hole HH-S may overlap the electronic module EM and at least a portion of the electronic module EM may be inserted into the second hole HH-S.

An electronic apparatus ED according to an embodiment of the inventive concept may include a module hole MH passing through a plurality of members. The module hole MH may pass through a polarization plate POL, a display panel EP, and a support member SM. The module hole MH may be a hole which includes the support part hole HH-SP in the support part, the compensation part hole HH-OP in the compensation part OP, a first hole HH-PP in the polarization plate POL, and the panel hole HH in the display panel EP. The electronic module EM may overlap the module hole MH and at least a portion of the electronic module EM may be disposed inside the module hole MH.

FIGS. 5 and 6 illustrates that the width of the second hole HH-S and the width of the panel hole HH are the same. However, the inventive concept is not limited thereto, and referring to FIG. 6, the width of the second hole HH-S and the width of the panel hole HH may be different from each other on a cross-section parallel to the surface formed by the first direction axis DR1 and the third direction axis DR3. In addition, the compensation part hole HH-OP and the support part hole HH-SP which are included in the second hole HH-S in the support member SM have the same width as the panel hole HH, but the inventive concept is not limited thereto. For example, the width of at least one among the compensation part hole HH-OP and the support part hole HH-SP may be different from the width of the panel hole HH. The compensation part OP may include a film layer PF and an adhesive layer AP5. The film layer PF may be a polymer film provided under the display panel EP. For example, the film layer PF may be a polyethylene terephthalate film, a polyimide film, or the like.

The compensation part OP including the film layer PF may be disposed under the display panel EP and function as a support layer that supports the display panel EP. In addition, the compensation part OP may be used to compensate a step difference. In other words, the compensation part OP may be disposed under the display panel EP to compensate for the thicknesses of the members disposed on the display panel EP.

The support member SM may include a support part SP disposed under the compensation part OP and the support part SP may include a cushion layer CM and a metallic support layer MP. The support part SP may further include at least one adhesive layer AP6 and AP7. The second hole HH-S in the support member SM may pass through the film layer PF, the cushion layer CM, the metallic support layer MP, and the adhesive layers AP5, AP6, and AP7 provided therebetween.

The cushion layer CM may be provided to protect the display panel EP and the electronic module EM from a physical shock applied from the outside of the electronic apparatus ED. In addition, the cushion layer CM may be provided in at least a predetermined thickness to implement the support part hole HH-SP, which is a through-hole. The thickness of the cushion layer CM may be at least about 50 µm. For example, the thickness of the cushion layer CM may be at least about 100 µm.

The cushion layer CM may be formed by including at least one among an acryl-based polymer, a urethane-based polymer, a silicon-based polymer, or an imide-based polymer. The cushion layer CM may have a strength to protect the display panel EP and the electronic module EM and form the support part hole HH-SP. In addition, the cushion layer CM may be a synthetic resin foam for shock absorption.

A sixth adhesive layer AP6 may further be disposed on the cushion layer CM. The sixth adhesive layer AP6 may couple the cushion layer CM and the film layer PF.

The metallic support layer MP may be a support substrate that supports members included in the electronic apparatus ED including the display panel EP. The metallic layer MP may be a thin-film metallic substrate. The metallic support layer MP may also be used for heat dissipation or to shield radio waves.

In addition, in FIG. 6, the metallic support layer MP included in the support part SP is illustrated to be a single layer, but the inventive concept is not limited thereto, and the support part SP may include a plurality of metallic support layers. In addition, adhesive layers may further be provided between the plurality of metallic support layers.

The support part SP disposed under the compensation part OP may function as a protective member that protects the display panel EP from external shocks. In addition, the support part SP may be provided in at least a predetermined thickness and function to compensate a step difference in the electronic apparatus ED. In other words, the thickness of the support part SP is adjusted, so that a neutral surface may be positioned on the display panel EP, and thus, durability of the electronic apparatus ED that operates by being folded or unfolded may be increased.

The electronic module EM is disposed under the display panel EP. A gap may be provided between the top surface of the electronic module EM and the display panel EP. The electronic module EM may overlap the panel hole HH. The electronic module EM may receive an external input transmitted through the panel hole HH or provide an output through the panel hole HH. In an embodiment of the inventive concept, an electronic module EM may be a camera module.

The electronic module EM may be accommodated in the housing HU. In an electronic apparatus ED according to an embodiment of the inventive concept, an electronic module EM may overlap the first hole HH-PP, the panel hole HH, the compensation hole part HH-OP and the support part hole HH-SP which pass through components disposed on the electronic module EM. The electronic module EM may receive inputs transmitted from the outside through the opening region OA of the window WM that overlaps the first hole HH-PP, the panel hole HH, the compensation hole part HH-OP, and the support part hole HH-SP formed by passing though the components disposed on the electronic module EM. In addition, in an embodiment of the inventive concept, an opening region QA may be variously formed inside an active region AA (FIG. 1) according to a region in which an electronic module EM is disposed. In addition, the positions of the first hole HH-PP, the panel hole HH, the compensation hole part HH-OP, and the support part hole HH-SP which pass through components disposed on the electronic module EM may also be variously formed according to the region in which the electronic module EM is disposed.

In an electronic apparatus ED according to an embodiment of the inventive concept, an electronic module EM is disposed overlapping an active region AA (FIG. 1), and thus, a separate space for disposing the electronic module EM in a peripheral region NAA (FIG. 1) may be omitted. Accordingly, the electronic apparatus ED according to the present embodiment may reduce a dead space by minimizing the peripheral region NAA (FIG. 1).

In the electronic apparatuses ED and ED-a according to embodiments of the inventive concept, the housing HU provides a predetermined accommodation space. The display module DM and the electronic module EM may be accommodated in the accommodation space and protected from external shocks. The housing HU may include a material having a relatively high stiffness. For example, the housing HU may include a plurality of frames and/or a plurality of plates which are composed of glass, plastic, or metallic materials. In addition, the housing HU may include a control unit, a hinge part, or the like which controls the folding or bending operation of the electronic apparatus ED.

Figure 9:
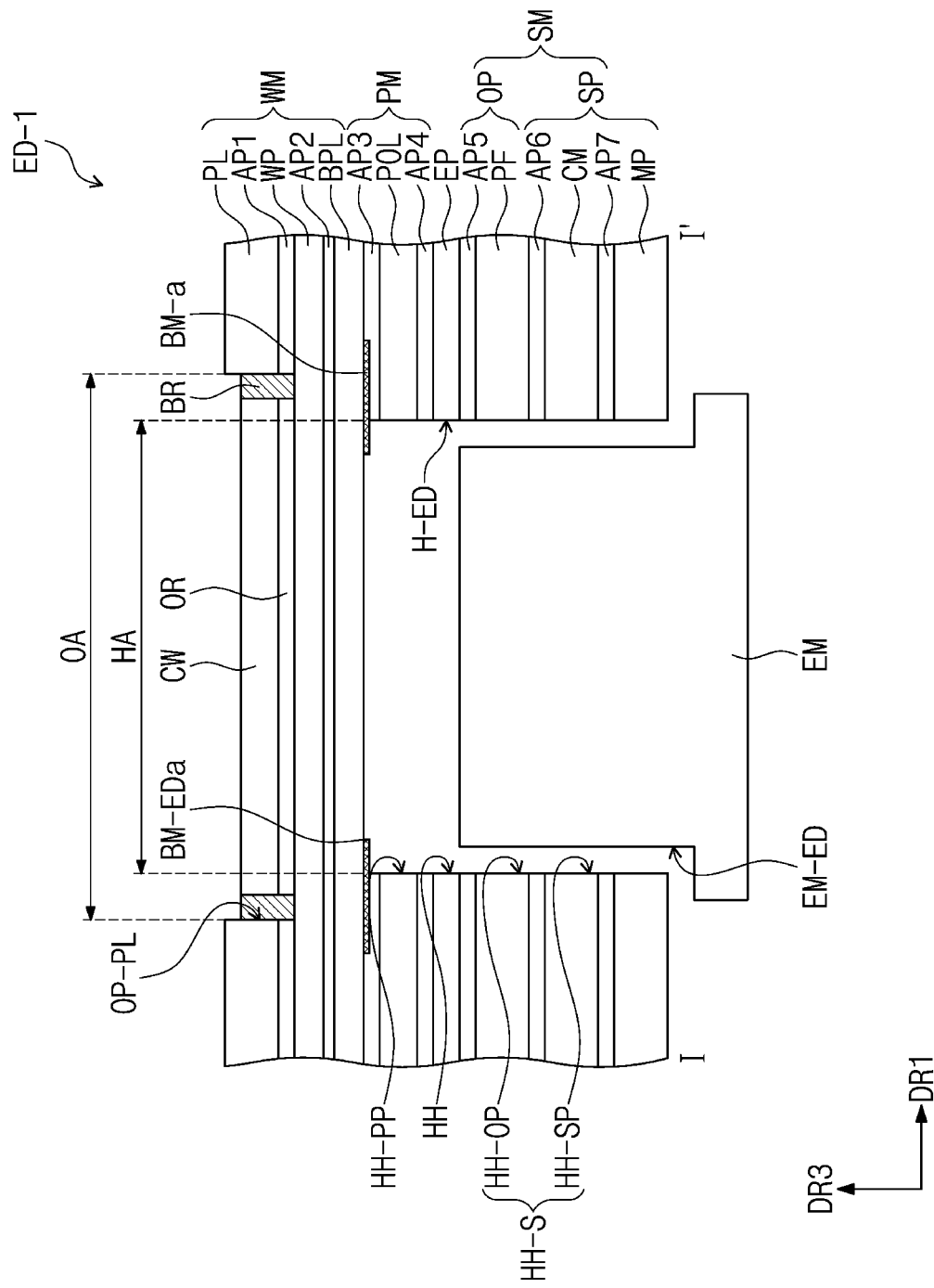
FIG. 9 is a cross-sectional view of an electronic apparatus according to an embodiment.
Figure 10:
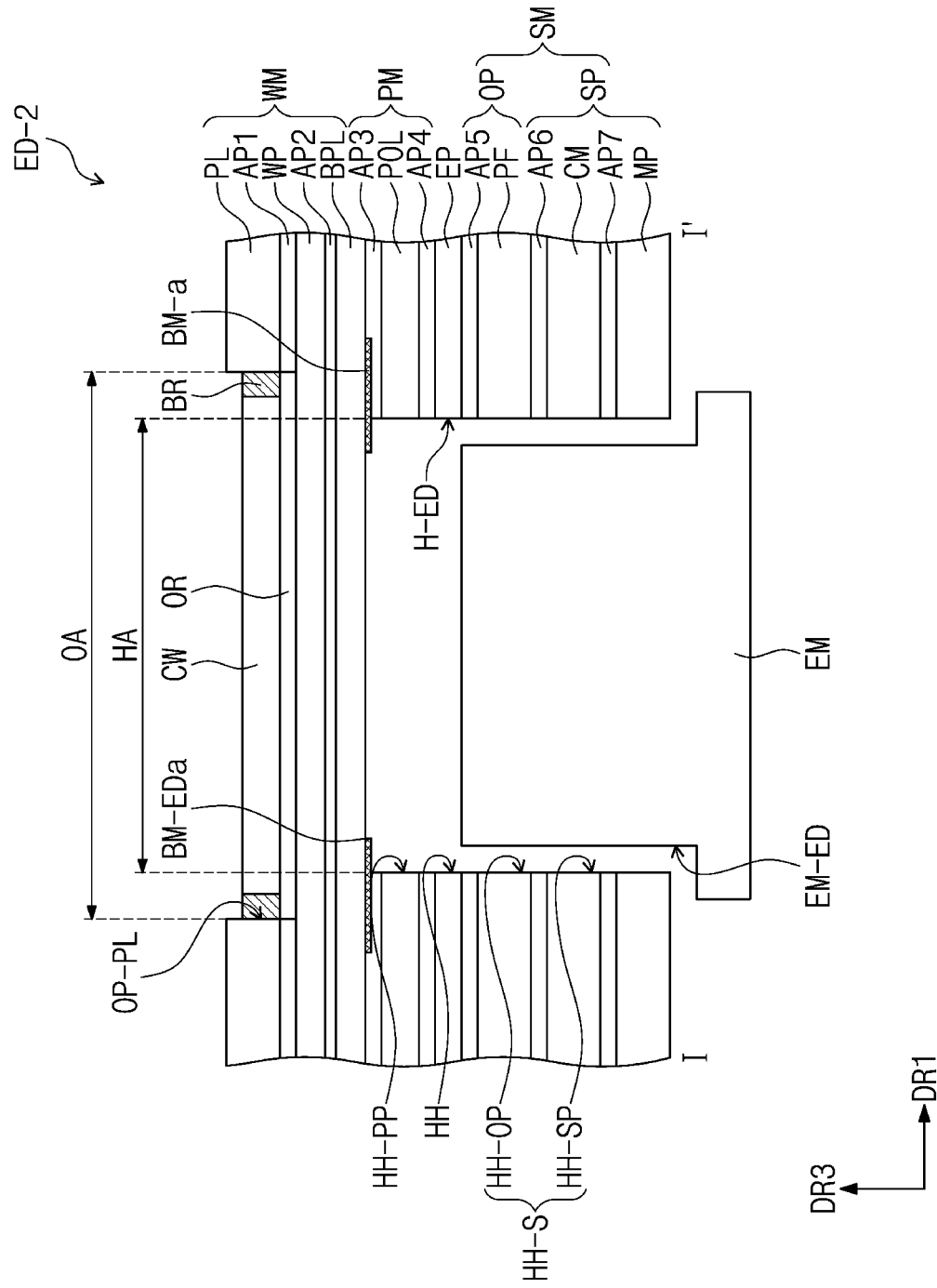
FIG. 10 is a cross-sectional view of an electronic apparatus according to an embodiment.

FIGS. 9 and 10 are cross-sectional views according to embodiments of the inventive concept. Hereinafter, in the description of the electronic apparatus according to the present embodiment, elements described in FIGS. 1 to 8 may not be described again, and the differences will be mainly described.

The electronic apparatuses ED-1 and ED-2 according to embodiments illustrated in FIGS. 9 and 10 may include a window WM, a display panel EP, and an electronic module EM, and the window WM may include a protective layer PL in which an opening OP-PL is disposed, and a cover glass CW disposed in the opening OP-PL. In the electronic apparatuses ED-1 and ED-2 according to the present embodiments, the window WM includes a shock absorbing layer BPL and the electronic apparatus ED-1 includes a support member SM disposed under the display panel EP.

The electronic apparatus ED-1 one of the embodiment illustrated in FIG. 9 may include a print pattern BM-a disposed on the lower surface of the shock absorbing layer BPL. In other words, the electronic apparatus ED-1 in the embodiment illustrated in FIG. 9 is different from the electronic apparatus ED in the embodiment illustrated in FIG. 6 due to the position at which the print pattern BM-a is disposed. The print pattern BM-a may be provided on the lower surface of the shock absorbing layer BPL adjacent to a polarization plate POL. For example, a first portion of the print pattern BM-a may be disposed in the third adhesive layer AP3 between the polarization plate POL and the shock absorbing layer BPL, and a second portion of the print pattern BM-a may be formed on the lower surface of the shock absorbing layer BPL and exposed within the module hole MH. The print pattern BM-a may be provided by printing a light-blocking material thereon. The description about the print pattern BM disposed under the abovementioned cover glass CW in FIG. 6 will be applied the same to the material of the print pattern BM-a disposed on the lower surface of the shock absorbing layer BPL in FIG. 9.

An edge BM-EDa of the print pattern BM-a may be disposed further inside a hole region HA than an edge H-ED of a panel hole HH. In the hole region HA, the print pattern BM-a may overlap an edge EM-ED of the electronic module EM. In other words, when viewed in a plane, the print pattern BM-a overlaps the hole edge H-ED and the electronic module edge EM-ED and may prevent the hole edge H-ED and the electronic module edge EM-ED from being viewed on the display surface FS.

In the electronic apparatus ED-1 according to an embodiment of the inventive concept, the print pattern BM-a is disposed under the shock absorbing layer BPL of the window WM and may cover the edge portions of members viewable from the hole region HA. In addition, the light incident on the electronic module EM in the outer side surface direction of the electronic apparatus ED-1 is blocked by including the print pattern BM-a that covers the edge EM-ED portion of the electronic module EM, and thus, the sensitivity of the electronic may be increased.

The electronic apparatus ED-2 in the embodiment illustrated in FIG. 10 is different from the electronic apparatus ED in the embodiment illustrated in FIG. 6 by including a print pattern BM-a disposed on the lower surface of a shock absorbing layer BPL and providing a transparent resin layer OR on the entirety of the lower surface of a cover glass CW. Like the electronic apparatus ED-1 in the embodiment illustrated in FIG. 9, the print pattern BM-a in the electronic apparatus ED-2 in the embodiment of FIG. 10 may be provided to the lower surface of the shock absorbing layer BPL adjacent to a polarization plate POL.

The transparent resin layer OR in the electronic apparatus ED-2 of the embodiment of FIG. 10 may be disposed as a single layer inside an opening OP-PL. The transparent resin layer OR may be disposed to fill the gap between opening in a first adhesive layer AP1. A light-blocking resin layer BR may be disposed on the transparent resin layer OR. In other words, the light-blocking resin layer BR may be disposed while filling the space between the cover glass CW and a protective layer.

The electronic apparatus of an embodiment of the inventive concept includes, on the window WM disposed on the electronic module EM, the protective layer PL in which the opening part OP-PL is defined and the cover glass CW disposed on the opening part OP-PL, and thus has strong durability and the sensitivity of the electronic module EM may be increased. In other words, the electronic apparatus according to an embodiment of the inventive concept may include the window WM in which the cover glass CW is disposed to overlap the electronic module EM which is a front-surface camera module, and thus may have excellent strength characteristics and high imaging quality.

An electronic apparatus according to an embodiment of the inventive concept may include a window WM, in which a cover glass CW is disposed in an opening region OA overlapping an electronic module EM, and thereby have increased durability.

An electronic apparatus according to an embodiment of the inventive concept may include an electronic module EM for imaging from a front surface thereof and a cover glass CW disposed in an opening region OA overlapping the electronic module EM, and thereby exhibit excellent imaging quality. For example, an embodiment of the inventive concept provides an electronic apparatus that increases quality of an image captured by a camera module in the direction of a display surface of the electronic apparatus.

While the inventive concept has been described with reference to exemplary embodiments thereof, it will be understood by those skilled in the art that various modifications and variations can be made thereto without departing from the spirit and scope of the inventive concept set forth in claims.

What is claimed is:

1. An electronic apparatus, comprising:
an electronic module;
a display panel having a panel hole which overlaps the electronic module; and
a window disposed on the display panel,
wherein the window comprises:
a base substrate;
a protective layer disposed on the base substrate and having an opening which overlaps the panel hole; and
a cover glass disposed on the base substrate inside the opening.

2. The electronic apparatus of claim 1, wherein a thickness from the base substrate to an upper surface of the cover glass is smaller than a thickness from the base substrate to an upper surface of the protective layer.

3. The electronic apparatus of claim 1, wherein the window further comprises a transparent resin layer disposed between the cover glass and the base substrate.

4. The electronic apparatus of claim 3, wherein the window further comprises a light-blocking resin layer disposed between the cover glass and the protective layer.

5. The electronic apparatus of claim 4, wherein the light-blocking resin layer surrounds an edge of the cover glass and fills a gap between the protective layer and the cover glass.

6. The electronic apparatus of claim 4, wherein an adhesive force of the light-blocking resin layer with respect to the cover glass is larger than an adhesive force of the transparent resin layer with respect to the cover glass.

7. The electronic apparatus of claim 1, wherein a width of the opening is larger than a width of the panel hole.

8. The electronic apparatus of claim 1, further comprising a print pattern disposed on a lower surface of the cover glass and overlapping an edge of the panel hole.

9. The electronic apparatus of claim 8, wherein the print pattern overlaps an edge of the electronic module.

10. The electronic apparatus of claim 9, wherein the print pattern surrounds the electronic module.

11. The electronic apparatus of claim 1, wherein the window further comprises a shock absorbing layer disposed under the base substrate.

12. The electronic apparatus of claim 11, further comprising a print pattern disposed on a lower surface of the shock absorbing layer and overlapping an edge of the panel hole.

13. The electronic apparatus of claim 12, wherein the print pattern overlaps an edge of the electronic module.

14. The electronic apparatus of claim 11, further comprising:
a polarization plate disposed between the display panel and the shock absorbing layer and having a first hole which overlaps the panel hole; and
a support member disposed under the display panel and having a second hole which overlaps the panel hole.

15. The electronic apparatus of claim 1, wherein the display panel is foldable.

16. The electronic apparatus of claim 1, wherein:
the display panel comprises a display region and a non-display region adjacent to the display region; and
the panel hole overlaps the display region and is spaced apart from the non-display region.

17. An electronic apparatus, comprising:
a window;
a display panel disposed under the window;
a polarization plate disposed between the window and the display panel;
a support member disposed under the display panel; and
an electronic module disposed under the display panel,
wherein the electronic module is disposed in a module hole passing through the polarization plate, the display panel and the support member, and
the window comprises:
 a substrate;
 a cover glass disposed on the substrate and overlapping the module hole; and
 a protective layer disposed on the substrate and not overlapping the module hole.

18. The electronic apparatus of claim 17, wherein:
the protective layer comprises an opening that overlaps the module hole; and
the cover glass is disposed in the opening.

19. The electronic apparatus of claim 17, wherein:
an upper surface of the window includes an upper surface of the cover glass and an upper surface of the protective layer; and
a height difference exists between the upper surface of the cover glass and the upper surface of the protective layer.

20. The electronic apparatus of claim 17, wherein:
the window further comprises a print pattern disposed on a lower surface of the cover glass; and
the print pattern overlaps an edge of the electronic module.

21. The electronic apparatus of claim 17, wherein the window further comprises:
 a transparent resin layer disposed between the substrate and the cover glass; and
 a light-blocking resin layer disposed between the cover glass and the protective layer.

22. An electronic apparatus comprising at least one folding region, the apparatus comprising:
an electronic module;
a display panel having a panel hole that overlaps the electronic module; and
a window disposed on the display panel, wherein:
the window comprises:
 a substrate;
 a protective layer disposed on the substrate, wherein the protective layer includes a polymer film and an opening which overlaps the panel hole;
 a cover glass disposed on the substrate and disposed inside the opening; and
 a print pattern disposed between the substrate and the cover glass and overlapping an edge of the panel hole.

23. The electronic apparatus of claim 22, wherein the window further comprises:
 a transparent resin layer disposed between the substrate and the cover glass; and
 a light-blocking resin layer disposed between the cover glass and the protective layer.

* * * * *